H. P. LOVELACE.
TIME CONTROLLED MOTION PICTURE ADVERTISING DEVICE.
APPLICATION FILED SEPT. 15, 1919.

1,364,771.

Patented Jan. 4, 1921.
4 SHEETS—SHEET 1.

Fig. 1.

Inventor
Hunter P. Lovelace

By Sturtevant & Mason Attorneys

H. P. LOVELACE.
TIME CONTROLLED MOTION PICTURE ADVERTISING DEVICE.
APPLICATION FILED SEPT. 15, 1919.
1,364,771.
Patented Jan. 4, 1921.
4 SHEETS—SHEET 2.
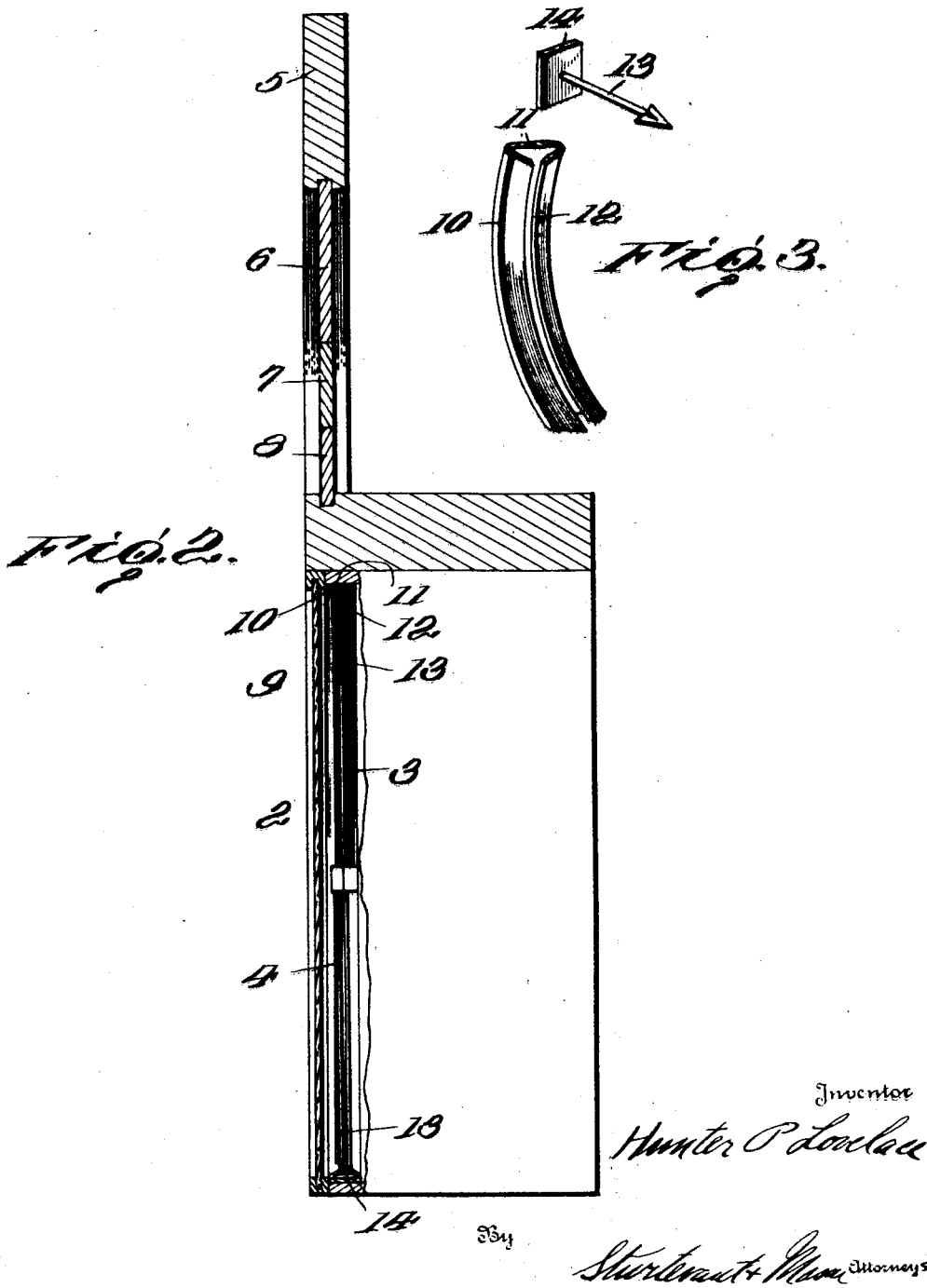

H. P. LOVELACE.
TIME CONTROLLED MOTION PICTURE ADVERTISING DEVICE.
APPLICATION FILED SEPT. 15, 1919.
1,364,771. Patented Jan., 4, 1921.
4 SHEETS—SHEET 3.
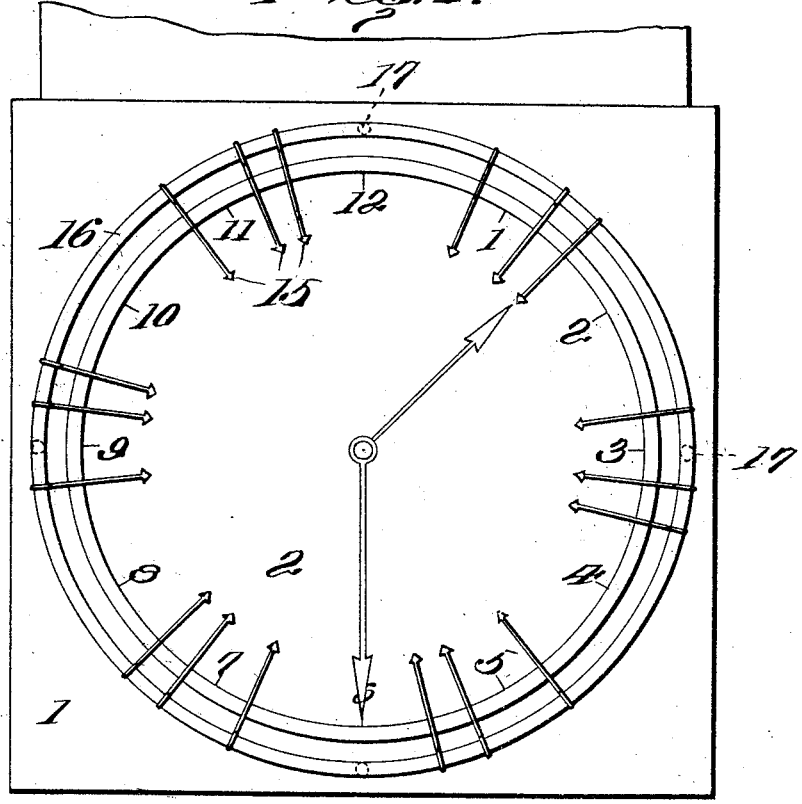
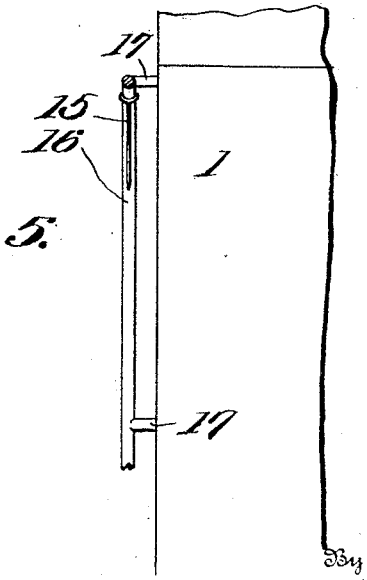

H. P. LOVELACE.
TIME CONTROLLED MOTION PICTURE ADVERTISING DEVICE.
APPLICATION FILED SEPT. 15, 1919.
1,364,771.  
Patented Jan. 4, 1921.  
4 SHEETS—SHEET 4.
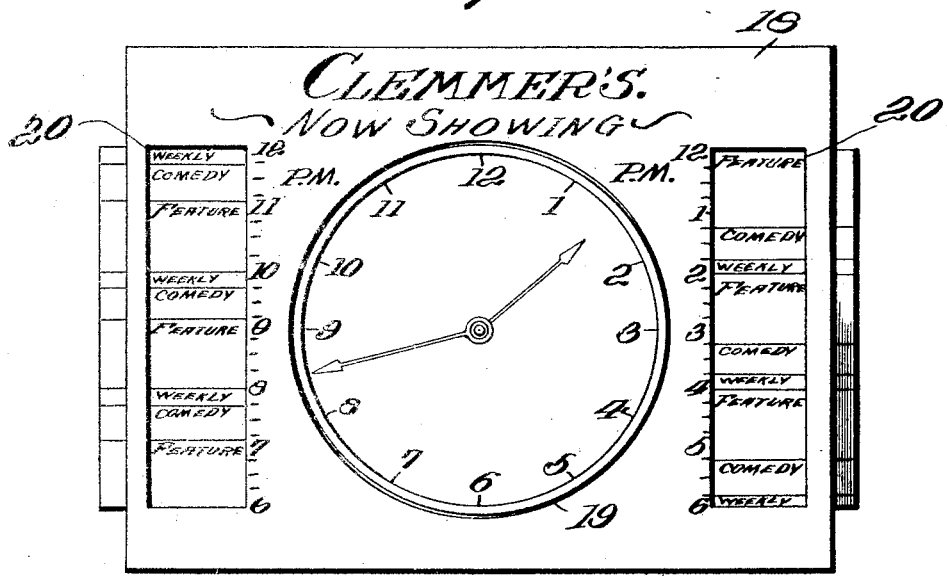
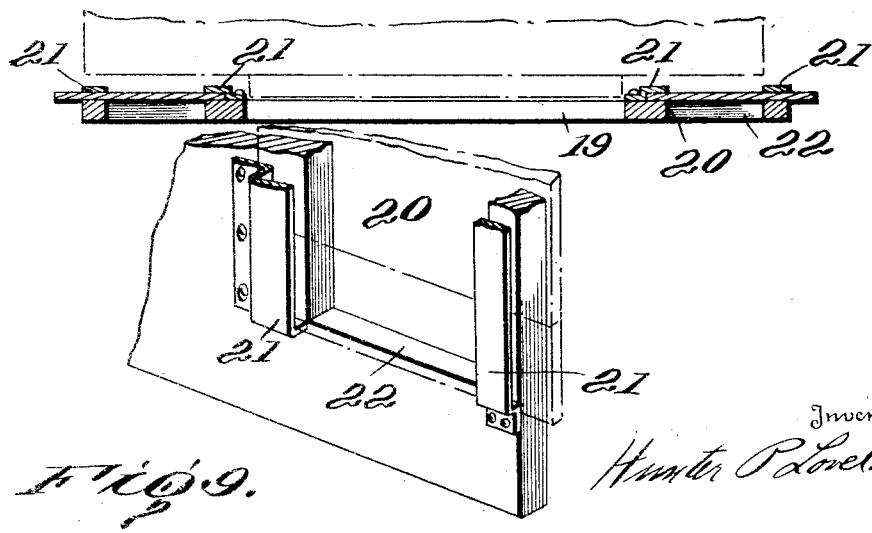
Inventor  
Hunter P Lovelace
By  
Sturtevant & Mason Attorneys

UNITED STATES PATENT OFFICE.

HUNTER P. LOVELACE, OF NEW YORK, N. Y.

TIME-CONTROLLED MOTION-PICTURE ADVERTISING DEVICE.

1,364,771. Specification of Letters Patent. Patented Jan. 4, 1921.

Application filed September 15, 1919. Serial No. 323,856.

*To all whom it may concern:*

Be it known that I, HUNTER P. LOVELACE, a citizen of the United States, residing at New York, in the county of New York, State of New York, have invented certain new and useful Improvements in Time-Controlled Motion-Picture Advertising Devices, of which the following is a description, reference being had to the accompanying drawing and to the figures of reference marked thereon.

This invention relates to motion picture advertising devices, and more particularly to devices adapted to display the titles of the various pictures presented and to indicate the times of their starting, as well as the progress of the various films.

The object of this invention is to provide a device of the above character adapted to be used with a clock for advertising the titles of the pictures displayed at a particular theater and arranged so that the hand or hands of a clock will indicate when the various pictures commence and their progress during projection.

A further object of this invention is to provide a device of the above character adapted to display titles of the pictures, and which in addition is provided with indicia corresponding to the titles adjustably arranged about the face of the clock, whereby the times of starting the various pictures are alterable.

A still further object of the invention is to provide an integral structure adapted to surround the face of a clock and bearing picture title indicia so arranged that the hand or hands of the clock denote the times of starting and progress of the various films.

These and other objects will in part be obvious and will in part be hereinafter more fully disclosed.

In the drawings, which show by way of illustration one embodiment of my invention:—

Figure 1 indicates a front view of the preferred form of my invention;

Fig. 2 is a side sectional view thereof;

Fig. 3 is a detail elevation of the indicia supporting rim;

Fig. 4 is a modification of the invention;

Fig. 5 is a side sectional view showing the manner of arranging the circular supporting rod bearing the indicia;

Fig. 6 is a detail elevation of this circular support;

Fig. 7 is a still further modification of the invention; and

Figs. 8 and 9 are sectional and elevation views, respectively, showing the manner of supporting the title bearing slides or panels.

In general, the invention embraces a display device to be used in connection with an ordinary clock wherein is set forth the name of the theater, and interchangeable panels or slides bearing the titles of the various pictures to be shown at that theater at any particular time. The clock at the face thereof is provided with a support adapted to adjustably bear a series of indicia or arrows which can be moved around the circumference of the dial in various positions relative to the numerals thereon. These arrows are vari-colored or otherwise distinctively marked, each to correspond to a title on the display member so that, after the arrows are set for a particular time at which a corresponding picture is to be projected, the hands of the clock will automatically notify the patrons of a theater the times of starting of the various films and their progress. The general principles of this invention are capable of many variations, some of which are hereinafter set forth.

Referring more particularly to the drawings, in Fig. 1 there is illustrated any type of ordinary clock comprising a frame 1 provided with the usual dial 2 and hands 3 and 4. Arranged adjacent the face of this clock, preferably at the top, is a display stand 5 adapted to bear suitable advertising matter, such as the name and location of the theater, the titles of the various films to be presented and suitable wording explaining the operation of the device.

It is preferred that the film titles be arranged on interchangeable slides or panels and distinctively colored. For instance, in Fig. 1 panel 6 indicating the feature film may be colored in red; panels 7 indicating the comedy to be shown may be colored in blue, and panel 8 denoting the weekly may be of any other distinctive color. It is also obvious that various and other expedients may be resorted to to designate the various film displays and to define them. For instance, the lettering may be distinctively colored instead of coloring the panels.

In order to provide an automatic time controlled device for indicating the times of starting and progress of projection of the various films set forth on the display or advertising stand, there is arranged about the periphery of the clock dial 2 between the same and the usual glass face 9 a circular slotted supporting member 10, here shown as a circular sheet metal strip double folded inwardly forming a retaining rim 11 and an inwardly facing slot 12 about the circumference of the dial. As shown in Fig. 2, this support is adapted to replace the single rim now used on the ordinary clock and to which the glass cover is usually hinged. Obviously any convenient construction or shape or any mode of holding this rim in place may be availed of.

Within the rim and projecting outwardly toward the hands of the clock are arranged a plurality of indicators adapted to correspond with the titles of the films, as will be hereinafter more fully explained. In this instance, they are shown as a plurality of arrows 13 provided with flat portions 14 which fit within the fold of the support, the shanks of the arrows projecting through the slot. The size of the flat portions 14 is such that the fit within the support will be snug and the arrows held in any position about the face of the clock. It will, of course, be clear that this feature of the invention is not confined to the form of the indicating marks and the manner of holding them or adjusting them about the face of the clock.

Each one of the arrows 13 is adapted to be colored to correspond with the particular slide or panel to which it relates. For instance, if the feature film shown on the blue panel 6, or shown in blue letters, or in any particular distinctive manner, is to be projected at one o'clock, a blue arrow or correspondingly distinctively marked indicator will be held in adjusted position immediately over the numeral I on the dial of the clock. Again, if the comedy shown on the red panel or otherwise is to be displayed at two or two-thirty o'clock, the correspondingly marked or red arrow will be held in adjusted position immediately over the two o'clock or the two-thirty mark on the face of the clock. It will also be apparent that as the projection of the pictures is continuous, these same pictures will be again shown at various hours or parts of hours of the day, in which case the correspondingly distinctively marked arrows are successively placed around the clock dial so that, as the hands of the clock move about, they will automatically indicate to the patrons of the theater the times when these various films start and also the progress of each particular film. In case it is desired to alter the times of starting of the successive films, all that is necessary is a corresponding adjustment of the indicators about the face of the clock.

In Figs. 4, 5 and 6, this same principle and mode of operation is used, except that the arrows or indicators 15 are carried by a circular support 16 borne by one or more posts 17 projecting into the front of the clock 1 about the face of the dial 2. In this instance, the arrow 15 terminates in a ring portion surrounding this circular rod. It is clear that this modification of the invention is to be used more in the nature of an attachment to the ordinary clock so that the structure of the same will not have to be modified, and it is apparent that any other manner of supporting the indicators from the clock so that they project over and toward the clock dial is within the contemplation of this invention.

In Figs. 7, 8 and 9, there is shown still another form of the invention. In this instance, there is provided an integral display board 18 of any suitable composition or shape apertured as at 19 to snugly receive or display therethrough the face of the clock. As in the other forms of the invention, this board will bear the name of the theater, its location, and any other suitable advertising matter that is desired. The film title display about the face of the clock may take several arrangements, but the preferred form is shown in Fig. 7, wherein there is located on opposite sides of the clock two vertical planes 20. These panels are preferably made removable and are adapted to slide through retaining strips 21 secured to the back of the board 18 so that the faces of the panels show through apertures 22 cut in the face of the board. If desired, the panels 20 may be in one integral strip or a plurality of separate panels may be provided. Starting with the right hand side of the board, there is arranged at the edge of the aperture 22 the numerals 12 to 6 running downwardly, while at the left hand side of the panel there is a similar arrangement of numerals running in the reverse order. The width of the panels, if they be separate, is such that any one particular panel will correspond to the distance between the hour or fractional hour marks arranged along the aperture 22. For instance, if the feature film runs from twelve noon to one-thirty, this panel will be of the width corresponding to the distance between the mark 12 along the aperture 22 and the mark corresponding to one-thirty. The comedy panel will then start at the one-thirty mark and will extend to the two o'clock mark, if its time of projection be that long. The remaining panels in succession are arranged in this same manner. If desired, each panel may be distinctively colored to present a clear line of demarcation to the eye of the patron.

In case it is desirable to make these title display slides integral, the width of each particular display title space may be arranged according to the time of projection of that particular picture. In this manner, it will be seen that as the hands of the clock move about the face of the dial they will automatically indicate the times of starting and the projection progress of each film shown in the theater. It is also obvious that these picture title display stands may be changed each day, according to the needs of the theater. It is clearly evident that instead of having an aperture in the board and the retaining strips at the back the same result can be accomplished by pasting or otherwise attaching prepared strips of paper bearing the titles arranged in spaced relation according to the times consumed in their projection.

It is obvious that minor changes in the details of construction and the arrangement of the parts may be made without departing from the spirit of this invention as set forth in the appended claims.

Having thus described the invention, what is claimed as new is:—

1. In a device of the character described, the combination of a clock, means denoting the titles of various film displays, and movable devices corresponding to said means separately movable about the face of said clock whereby the times of starting of said various film displays is indicated.

2. In a device of the character described, the combination of a clock, means denoting the titles of various film displays, a series of separately adjustable indicators each corresponding to one of the titles of the film displays, and means for supporting said indicators in adjusted position about the face of said clock whereby the times of commencement of the various film displays is indicated.

3. In a device of the class described, in combination with a clock, a plurality of distinctive members denoting the titles of various pictures, a support projecting from the face of said clock, a plurality of indicia corresponding to said titles adjustably carried by said support and projecting toward the hands of said clock.

4. In a device of the character described, the combination of a clock, a plurality of means each distinctively marked to denote the titles of various film displays, and devices each distinctively marked to correspond with said means arranged about the face of said clock, whereby the times of starting of said various film displays is indicated.

5. In a device of the character described, the combination of a clock, distinctively colored means denoting the titles of various film displays, a series of indicators each colored to correspond to one of the titles of the film displays, and means for adjustably supporting said indicators in position about the face of said clock whereby the times of commencement of the various film displays is indicated.

6. In a device of the class described, in combination with a clock, a plurality of distinctive members bearing the titles of various pictures, a slotted rim located around the dial between the same and the glass, a plurality of indicia corresponding to said titles adjustable in said rim and projecting toward the clock hands.

In testimony whereof I affix my signature.

HUNTER P. LOVELACE.